United States Patent [19]

Todoki

[11] Patent Number: 5,446,520
[45] Date of Patent: Aug. 29, 1995

[54] APPARATUS FOR ARRAYING SHEETS OF PHOTOSENSITIVE MATERIAL

[75] Inventor: Kenji Todoki, Wakayama, Japan

[73] Assignee: Noritsu Koki Co., Ltd., Wakayama, Japan

[21] Appl. No.: 261,042

[22] Filed: Jun. 14, 1994

[30] Foreign Application Priority Data

Jun. 15, 1993 [JP] Japan ................. 5-143422

[51] Int. Cl.$^6$ .............. G03B 27/32; G03B 27/52
[52] U.S. Cl. ...................... 355/27; 354/298; 355/28
[58] Field of Search ............... 355/27-29, 355/50; 354/298

[56] References Cited

U.S. PATENT DOCUMENTS

| | | |
|---|---|---|
| 4,035,074 | 7/1977 | Flor ................................ 355/27 |
| 4,705,376 | 11/1987 | Schaub et al. ............... 354/298 |
| 4,864,355 | 9/1989 | Knecht et al. ................ 355/27 |
| 4,926,211 | 5/1990 | Ozawa ........................... 355/28 |

Primary Examiner—Richard A. Wintercorn
Attorney, Agent, or Firm—Wenderoth, Lind & Ponack

[57] ABSTRACT

An apparatus for arraying sheets of photosensitive material provided in a film printing/developing apparatus. A sorting guide is provided for selectively feeding the sheets of photosensitive material according to their size. The sorted sheets are fed further either in a one-line arrangement or in a two-line zigzag arrangement to an upper outlet or to a lower outlet by guides. Along the path to the lower outlet are mounted one-way rollers and high-speed rollers, so that the sheets of photosensitive material in a two-line zigzag arrangement will be fed at high speed. The sheets of photosensitive material thus fed out of the lower outlet are overlapped one upon another on the pan by means of a conveyor in the order of the frames in one roll of film.

3 Claims, 5 Drawing Sheets

APPARATUS FOR ARRAYING SHEETS OF PHOTOSENSITIVE MATERIAL

This invention relates to an apparatus for arraying sheets of photosensitive material used to array the printed and developed sheets of photosensitive material according to a predetermined order.

In a conventional film printing/developing apparatus, a roll of photosensitive material is fed continuously to an exposure unit in which a film image in each frame on a negative film is exposed onto a sheet of photosensitive material on an exposure table. After the sheets of photosensitive material have been fed to a developing unit and developed while passing through a tank containing developing solutions, they are dried and drawn out.

The photosensitive material to be exposed on the exposure table is cut into sheets before developing. The sheets are fed in a line to the developing unit, in which there is a gap between the sheets of photosensitive material to avoid the contact therebetween.

In such a conventional film printing/developing apparatus, the speed for developing the sheets of photosensitive material in the developing unit is much lower than the speed for exposing the images onto the sheets in the exposure unit. Therefore, in order to increase the capacity of the film printing/developing apparatus, it is necessary to increase the capacity of the developing unit.

On the assumption that the sheets of photosensitive material are fed in one line, one method proposed was to increase the rack length in the carrier device to increase the number of the sheets developed per hour. However, the longer the rack length is, the longer the length of the developing unit as a whole, the larger the size of the tank and the more the amount of the developing solutions are.

As another solution, it was proposed to stagger the feed direction of the exposed sheets of photosensitive material and adjust the feed direction while they are being fed to develop them in a zigzag arrangement.

With this developing method, it is possible to increase the capacity of the developing unit considerably without increasing the rack length of the developing unit.

However, since the sheets of photosensitive material are staggered and fed in two lines in the developing unit, if the order of the sheets of photosensitive material is to correspond to the order in one roll of film, the sheets fed in two lines have to be rearranged in one line again.

Let us suppose that a conveyor continuously driven is provided near the outlet of the developing unit to overlap them to the order in one roll of film. In this case, when the preceding sheet is placed entirely on the conveyor, part of the next sheet is already discharged. This might damage the edge of the next sheet due to the contact with the conveyor. Moreover, the sheets of photosensitive material cannot be arrayed tidily if they are dropped onto the conveyor which is continuously driven.

It is an object of the present invention to provide an apparatus for arraying sheets of photosensitive material in a film printing/exposing apparatus which solves the abovesaid problems and in which even if the sheets of photosensitive material are discharged in a two-line zigzag arrangement from the developing unit, they are overlapped not in two lines but in one line in the same order as the frames in one roll of film.

According to the present invention, there is provided an apparatus for arraying sheets of photosensitive material in a film printing/developing apparatus having a printing unit and a developing unit, the apparatus comprising: a carrier means comprising a plurality of pairs of one-way rollers and a plurality of high-speed rollers for feeding the sheets of photosensitive material near the outlet of the film printing/developing apparatus; and a conveyor provided outside of the outlet in a direction perpendicular to the direction in which the sheets of photosensitive material are discharged, so as to be driven intermittently.

In this case, in order to feed the sheets of photosensitive material at high speed, each high-speed roller should preferably comprise a driving roller, mating rollers and a pair of rollers provided on both sides of the mating roller and having a larger diameter than that of the mating rollers, so that the sheets of photosensitive material will be curved into an arcuate shape.

Moreover, the sorting guide may be provided to selectively feed the sheets either to the one-way rollers or to a stocker according to the size of the sheets of photosensitive material.

In the apparatus in this invention, the sheets of photosensitive material fed in a zigzag arrangement by the one-way rollers are fed at high speed by the high-speed rollers. They are fed further as soon as they are put on the conveyor, and arrayed and overlapped one on another on the pan.

In the apparatus in this invention, there are provided a carrier unit comprising one-way rollers and high-speed rollers, and a conveyor provided outside the outlet of the carrier unit intermittently and driven in a perpendicular direction thereto. Thus, the sheets of photosensitive material fed in a two-line zigzag arrangement are fed at high speed to the conveyor and arrayed in the order of the frames in one roll of film. This makes it possible to prevent the sheets from overlapping in a mixed-up order.

Other features and objects of the present invention will become apparent from the following description made with reference to the accompanying drawings, in which.

Figure 1:
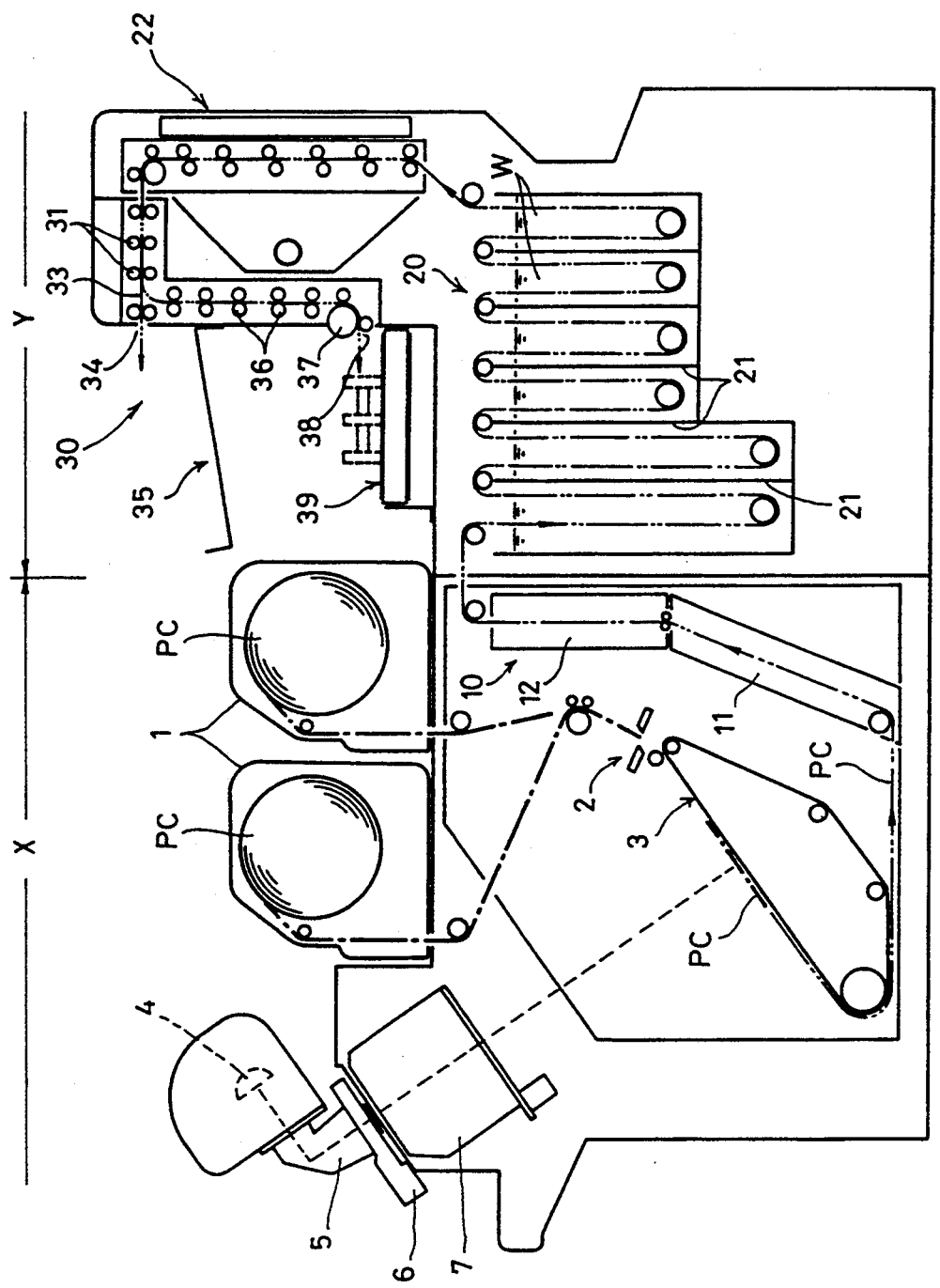
FIG. 1 is a schematic view of the film printing/developing apparatus having the apparatus for arraying photosensitive material according to the present invention.

Referring to FIG. 1, X designates a printing (exposure) unit and Y does a developing unit. Since the structure of the printing (exposure) unit X is known, only the main components will be mentioned below. It comprises magazines 1 containing rolls of photosensitive material PC, a cutter 2, a suction belt 3, a light source 4, a mirror tunnel 5, a negative mask 6 and a lens unit 7.

After the sheets of photosensitive material PC have been printed and exposed in the printing (exposure) unit X, they are fed to a sorting device 10 in the direction of arrow by a carrier unit. The sorting device 10 comprises a sorting unit 11 for sorting the sheets of different sizes and a conveyor 12 for feeding the thus sorted sheets of photosensitive material PC to the developing unit Y.

If the sheets of photosensitive material PC fed in a line to the sorting unit 11 are smaller than a predetermined size, the sorting unit 11 will feed them in two lines in a zigzag arrangement. If they are larger, the sorting unit 11 will keep feeding the sheets in one line. The conveyor 12 feeds the sheets to the developing unit Y keeping a one-line or a two-line zigzag arrangement. Though not shown, the sorting unit 11 has a movable table which can move the sheets in a crosswise direction.

A tank 20 contains different kinds of developing solutions W in a plurality of portions partitioned by a plurality of partitioning walls 21. Also, a waste solution tank and a supplemental tank are usually provided, but not shown in the figure. In a drying unit 22, the sheets of photosensitive material PC are dried by a heater while they are being fed therein by the conveyors. Then, after turning the direction by 90 degrees, the sheets are fed horizontally toward an outlet.

Figure 2:
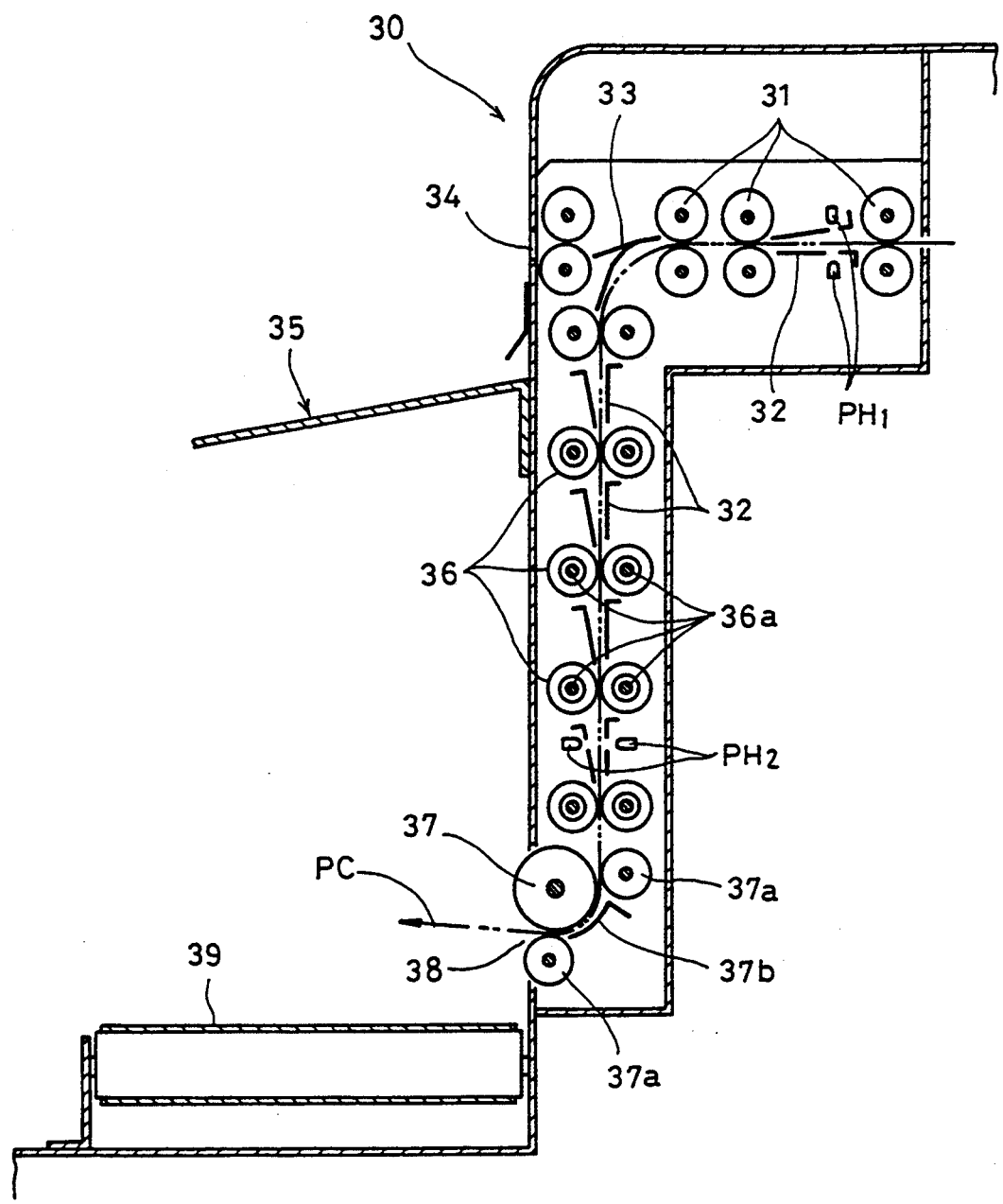
FIG. 2 is a sectional view of the apparatus according to the present invention.

Along the above-mentioned path, an arraying apparatus 30 is provided. It is shown in detail in FIGS. 2-4. As shown in FIG. 2, the sheets of photosensitive material PC are sorted by a sorting guide 33 in the arraying apparatus 30 and fed either in a horizontal direction to an outlet 34, or to an outlet 38 after turning the direction by 90 degree downward. In the figures, there are illustrated a plurality of pairs of carrier rollers 31, guides 32, and light sensors PH1.

If the width of the sheets of photosensitive material PC is 89 mm to 6 inches, they are turned downward and guided to the outlet 38 by the sorting guide 33. If between 6.5 inches to 254 mm (10 inches), they are fed horizontally to the outlet 34. Thus, the sorting guide 33 is pivotable up and down from the center line of the horizontal feed path shown by a broken line in FIG. 1.

Outside of the outlet 34 is fixed a pan 35. Along the vertical path are mounted a plurality of pairs of one-way rollers 36 and high-speed rollers 37. The outlet 38 is formed at the end of the vertical path to discharge the sheets of photosensitive material PC in a horizontal direction. Further, mating rollers 37a cooperating with the high-speed rollers 37 and a guide 37b are provided.

The detailed structure of the one-way rollers 36 is not shown in the figures. Each one-way roller 36 is rotated together with its central shaft 36a by e.g. engagement by spring. The sheets of photosensitive material PC, sandwiched and fed by the one-way rollers 36, are pulled at high speed by the high-speed rollers 37. If the torque produced by the tensile force is larger than the torque of the one-way rollers 36, the one-way rollers 36 will rotate freely in the same direction with the engaging portion by the spring slipping.

The one-way rollers 36 are arranged as above in this embodiment, but they may be arranged in any other way.

The high-speed rollers 37 are driven at high speed, but its timing, etc. shall be explained later. The rotation speed of the high-speed rollers 37 are two to fifteen times as high as the other rollers. PH2 are a pair of light sensors for detecting the number of sheets of photosensitive material PC.

Figure 3:
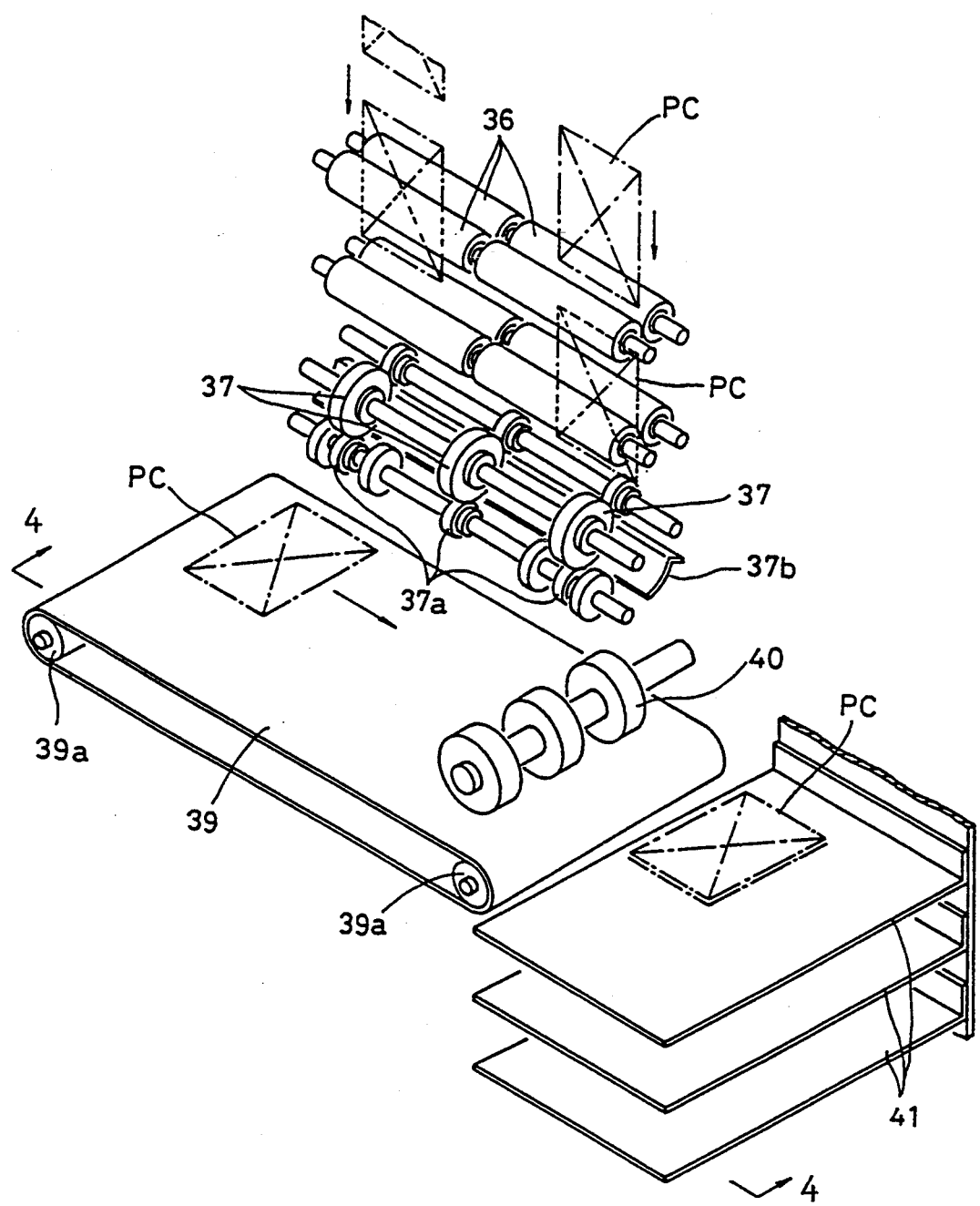
FIG. 3 is a perspective view of the same.

Outside of the outlet 38 is provided a conveyor 39 which feeds the sheets of photosensitive material PC in a perpendicular direction with respect to the vertical path. FIG. 3 is a perspective view of the conveyor 39, which is driven by a driving unit (not shown) coupled to pulleys 39a. Presser rollers 40 are also provided.

Downstream of the conveyor 39 are provided a plurality of steps of pans 41 which receive the sheets of photosensitive material PC thereon. The pans 41 are attached to a vertically movable endless belt (not shown) and arranged so that each step of them will be horizontal when moved to the level of the conveyor 39. After the sheets of photosensitive material PC corresponding to the frames contained in one roll of film have been arrayed on one step of the pans 41, it will move downward and the next step will come to the same level with the conveyor 39 as shown in FIG. 3.

Figure 4:
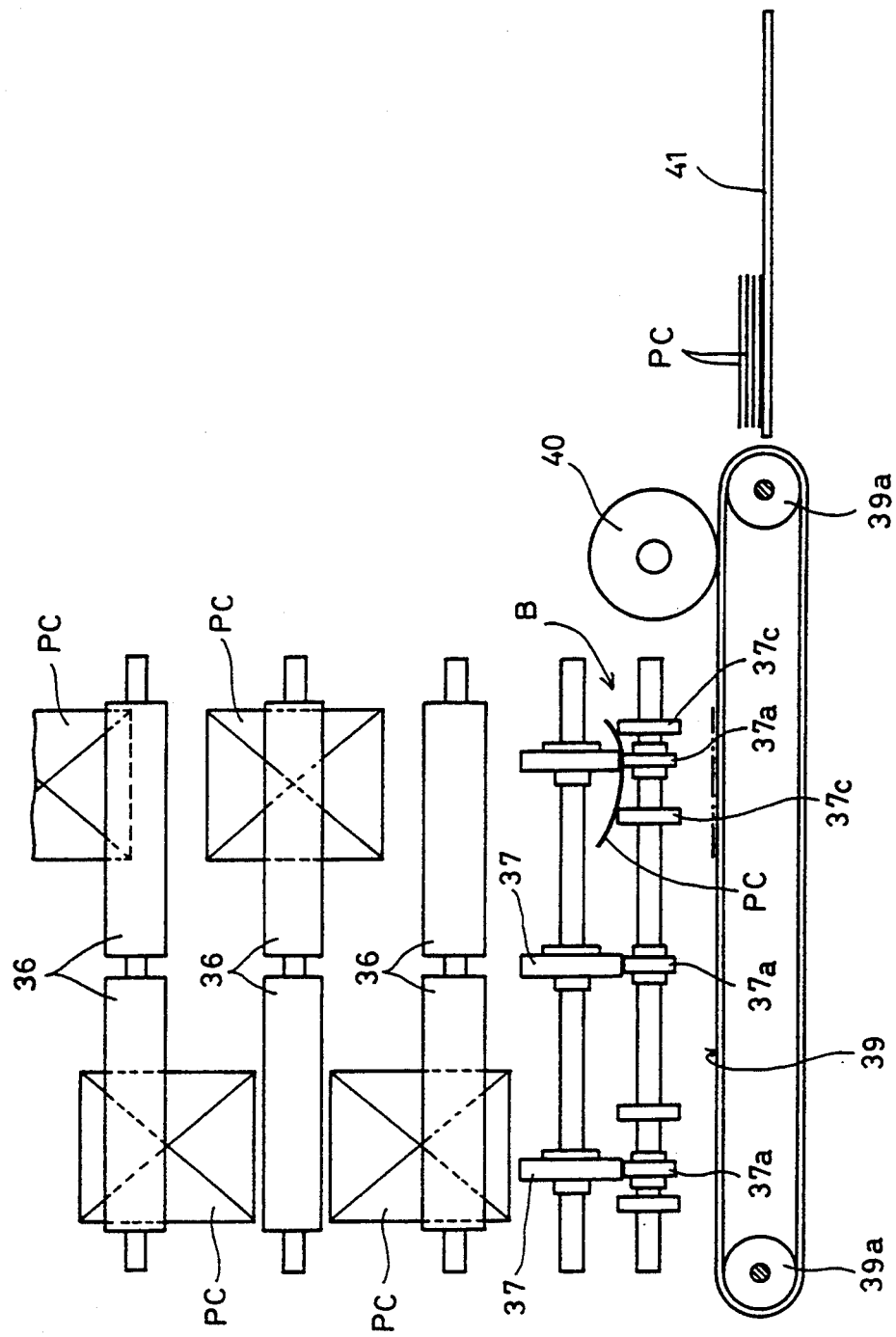
FIG. 4 is a front view as viewed from line A—A of FIG. 3.
Figure 5:
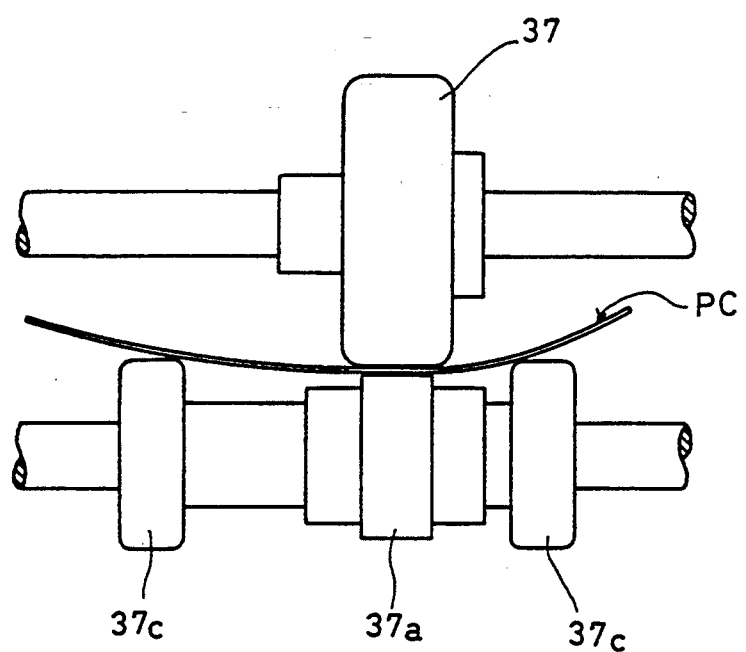
FIG. 5 is an enlarged view of a portion around B of FIG. 4.

FIG. 4 is a front view as viewed from line A—A of FIG. 3 whereas FIG. 5 is an enlarged view of a portion designated by B in FIG. 4. As will be apparent from FIG. 4, the sheets of photosensitive material PC are fed in a two-line zigzag arrangement when they are passing the one-way rollers 36. This is because the sheets PC have already been in a two-line zigzag arrangement while they are developed in the tank 20 in the developing unit and are thereafter fed forward in this arrangement.

As shown in FIG. 5, guide rollers 37c are mounted at both sides of each mating roller 37a in order to curve both edges of the sheets of photosensitive material PC into an arcuate shape. This prevents relatively long sheets of photosensitive material PC, especially a panorama size, from hanging down while discharged, from sticking to the conveyor belt due to static electricity or from getting caught at the roller near the outlet.

The apparatus for arraying sheets of photosensitive material PC of the present invention operates in the following manner.

The sheets of photosensitive material PC fed horizontally by the carrier rollers 31 are sorted, as described above, according to the size by the sorting guide 33. If the sheets have a width of 89 mm to 5 inches, they are fed downwardly in a two-line zigzag arrangement. If 6 inch wide, they are fed downward in the middle of the pairs of the one-way rollers 36 in a one-line arrangement. If they have a width of 6.5 inches to 254 mm, they are discharged horizontally from the top. Namely, if 6.5 inches or over, as in the conventional apparatus, they are fed in a one-line arrangement during development and then discharged in this arrangement. Thus, they are overlapped one on another in turn as they are discharged.

The sheets of photosensitive material PC to be sorted by the sorting guide 33 are distinguished by detecting signals supplied from the light sensors PH1. If a control circuit (not shown) receives the information that the sheet has a width of over 6.5 inches and the light sensors PH1 detect that the front end of the sheet has passed, both signals will command to activate a solenoid to cause the sorting guide 33 to feed the sheets PC horizontally.

If it is 6 inches or less than 5 inches, the sorting guide 33 is pivoted down to feed the sheets downward. The sheets are fed by the one-way rollers 36 while they move downward. When a front end thereof has passed the high-speed rollers 37, the sheet will be fed at high speed to the outlet 38 and discharged therefrom. If a rear end of the sheet is still in contact with the one-way rollers 36, it is pulled by the high-speed rollers 37. As described above, even in this case, the sheets are protected against breakage because the one-way rollers 36 will idle and slide on the sheets of photosensitive material PC.

The discharged sheets PC are fed in a perpendicular direction with respect to the vertical path by the conveyor 39 (i.e. in a horizontal direction). In this state, the sheets having a width of less than 5 inches are fed in a two-line zigzag arrangement. As soon as the conveyor 39 receives one of the sheets thereon, it is actuated and transfers it to the pan 41. In the embodiment, it is assumed that the feed speed is such that the next sheet has not yet come to the high-speed rollers 37.

After the first sheet has been transferred to the pan 41, the conveyor 39 stops its actuation. When the next sheet is discharged on to the conveyor 39, it is activated again. Thus, the sheets fed one after another are overlapped on the pan 41 by the conveyor 39 which is driven intermittently. The sheets of photosensitive material PC are overlapped one upon another in the order of the frames in one film.

If the width is 6 inches, the sheets are fed in the middle of the one-way rollers 36. Therefore, the sheets are arrayed and overlapped one upon another as discharged from the conveyor 39.

During the intermittent actuation of the conveyor 39, the rear end of the sheet fed at high speed is detected by the light sensors PH2 when each sheet passes through. After a predetermined time after the rear end of each sheet has passed, the conveyor 39 is driven to feed it.

Also, the number of the sheets which have passed is counted by the signals from the light sensors PH2. Then, the control circuit compares this number with the number of frames in one roll of film. If they detect that all the sheets of photosensitive material have been transferred to the pan 41, it will be moved downward.

In the above embodiment, the sheets are sorted by the sorting guide 33 according to the size, but it may be omitted. In that case, all the sheets of photosensitive material PC are fed along the path made up of the one-way rollers 36.

What is claimed is:

1. An apparatus for arraying sheets of photosensitive material in a film printing/developing apparatus having a printing unit and a developing unit, said apparatus comprising:

a carrier means comprising a plurality of pairs of one-way rollers and a plurality of high-speed rollers for feeding the sheets of photosensitive material near the outlet of the film printing/developing apparatus; and a conveyor provided outside of said outlet in a direction perpendicular to the direction in which the sheets of photosensitive material are discharged, so as to be driven intermittently.

2. An apparatus for arraying sheets of photosensitive material as claimed in claim 1 wherein each of said high-speed rollers comprises driving rollers, mating rollers and a pair of rollers having a larger diameter than said mating rollers and arranged at both sides of said mating rollers so as to feed the sheets of photosensitive material in an arcuate shape.

3. An apparatus for arraying sheets of photosensitive material as claimed in claim 1 wherein a sorting guide is provided upstream of said one-way rollers to selectively feed the sheets either to said one-way rollers or to a stocker according to the size of the sheets of photosensitive material.

* * * * *